Nov. 27, 1928.
1,692,943
J. LELYVELD
FOOT DEMONSTRATOR
Filed May 6, 1926
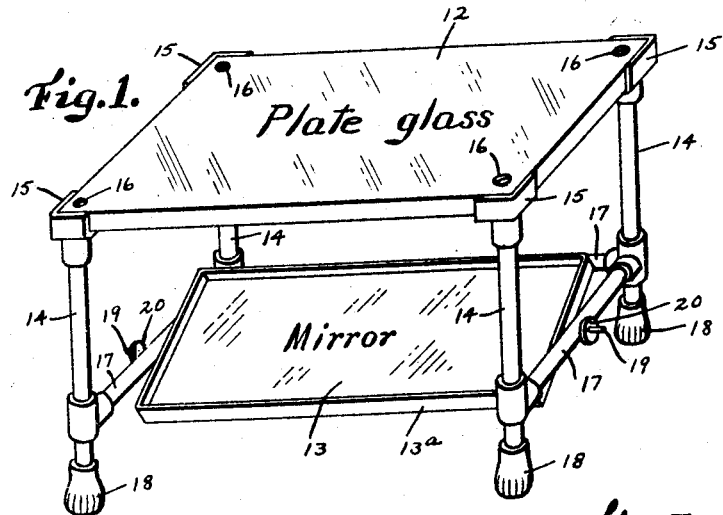
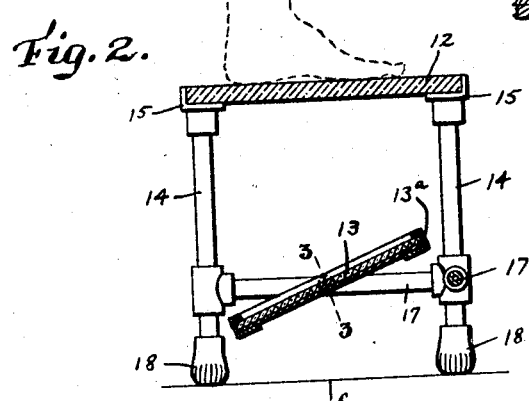
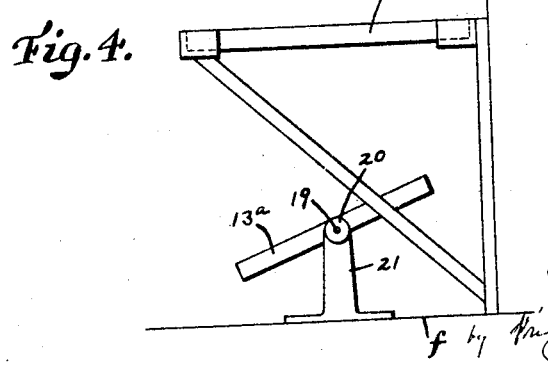
Inventor
Joseph Lelyveld Patented Nov. 27, 1928.

1,692,943

UNITED STATES PATENT OFFICE.

JOSEPH LELYVELD, OF ROCKLAND, MASSACHUSETTS.

FOOT DEMONSTRATOR.

Application filed May 6, 1926. Serial No. 107,019.

This invention relates to a foot demonstrator including a transparent tread, adapted to support the weight of a standing person whose feet require observation by a skilled observer, the tread being supported horizontally, suitably raised above a floor and presenting a flat upper surface on which the bottom surfaces of the feet are pressed and flattened by the weight of the body, and a mirror located under the tread, in position to show a reflection of a foot bottom bearing on the upper surface of the tread, the object being to enable an observer to quickly and conveniently obtain desired information about a foot, by observing the extent to which the bottom of the foot when pressed by the weight of the body against the tread, comes in contact with, and is flattened by the flat upper surface of the tread, the foot being bare, or covered only by a stocking. The extent of the contact between the foot bottom and the tread revealed by the reflection, indicates what the observer desires to know.

The chief object of the invention is to provide improved means for supporting the tread in such manner that the bottom surface of the tread may be conveniently cleaned, free access of light from the room containing the demonstrator to the bottom surface of the tread is permitted for the illumination of a foot bottom thereon, and a reflection by the mirror is visible from a point wholly at one side of the demonstrator, and without obstruction by the tread and by the feet thereon.

Another object is to provide means for so adjusting the mirror relative to the tread, that the mirror and a reflection made thereby may be viewed from a point at one side of the demonstrator, and at any desired elevation above the floor supporting the same, so that the observer may use the demonstrator when either standing or sitting.

Of the accompanying drawings forming a part of this specification,—

Figure 1 is a perspective view of a demonstrator embodying the invention.

Figure 2 is a vertical sectional view.

Figure 3 is a fragmentary section on line 3—3 of Figure 2.

Figure 4 is an end view, showing a modification.

The same reference characters indicate the same parts in all of the figures.

In the drawings, 12 designates a tread composed of a plate of thick plate glass, preferably of sufficient area to enable both feet of a standing person to bear on it the entire weight of the body being superimposed on the feet. The tread is supported horizontally, and suitably elevated above a floor by an open frame, as hereinafter described. 13 designates a mirror located under the tread and positioned to show a reflection of the bottom of a foot bearing on the tread. The mirror is preferably inclined relatively to the tread, so that the reflection may be seen from a point at one side of the demonstrator and above the tread, the arrangement being such that an observer occupying a position adjacent to the tread, may conveniently study the reflection while sitting or standing beside the demonstrator, this line of vision being wholly outside the tread, so that vision is not obstructed by the tread and by feet bearing thereon.

A portable structure embodying the invention may be made as indicated by Figures 1 and 2. Said structure includes an open frame comprising standards 14, having socketed seats 15 at their upper ends, to which the corner portions of the tread are attached by screws 16, the standards extending downward from the tread, and being spaced apart to permit the passage of light in various directions from the room containing the demonstrator to the tread, for the illumination of a foot bottom bearing on the tread, and to permit access to the bottom surface of the tread for the cleaning of the same. The legs are arranged in pairs, as shown by Figure 1, the standards of each pair being spaced apart, and each pair of standards being spaced from the other. The standards of each pair are connected by a transverse tie rod 17, located at the lower portion of the openings between said standards. The lower ends of the standards may be provided with rubber tips 18, to bear on a floor $f$.

The mirror frame 13$^a$ is provided with trunnions 19, at its opposite ends, journaled in bearings in two of the tie-rods 17, so that the mirror is pivotally mounted on a horizontal axis, and may be variously inclined relative to the tread. Any suitable means may be provided for preventing loose turning movements of the trunnions in their bearings, and thus maintaining the mirror at any desired inclination. In this instance, the trunnions are screw-threaded at their outer end portions and provided with clamping nuts 20, adapted to be set up against the tie-rods 17 in which the trunnions are journaled, and thus frictionally oppose turning movements of the trunnions.

As shown by Figure 4, the tread may constitute the shelf member of an open bracket-shaped frame fixed to a wall $w$ and including spaced apart inclined standards 23, and the mirror may be pivotally supported to turn on a horizontal axis by standards 21, fixed to a floor $f$.

In each of the described embodiments the open frame permits access to the bottom surface of the tread for cleaning, the passage of light from the room to the bottom surface of the tread for the illumination of a foot bottom thereon, and observation of the mirror from a point wholly at one side of the demonstrator, and without obstruction of vision by the tread and by feet thereon. In each embodiment the pivotal mounting permits the mirror to be viewed between the standards from different elevations above the floor $f$, so that the observer may use the demonstrator conveniently when either standing or sitting.

The described provision for illuminating the bottom of the tread and feet thereon, enables the demonstrator to be used by daylight and in a sufficiently lighted room at night, without a source of light within the demonstrator.

The demonstrator may be used by podiatrists to determine the position and condition of the arches of the feet when the feet support the weight of the body, and to indicate the type of shoe required, in view of the conditions indicated. It permits a quick examination, so that a large number of subjects, such as police officers, army recruits, soldiers, etc., may be observed in a brief period, the subjects following each other on the tread.

The demonstrator may be used in shoe stores to indicate sizes of shoes required, the width of the arches of the feet, and the required width of the shank portions of the shoes.

I claim:

1. A foot demonstrator comprising a flat transparent tread, an open frame surmounted by and horizontally supporting the tread, and a mirror located under the tread and arranged to reflect a foot bottom bearing on the tread, the frame including tread-supporting standards extending downward from the tread and spaced apart, to permit access to the bottom of the tread for cleaning, and the passage of light between the standards to the tread for illumination of a foot bottom thereon, the arrangement being such that a reflection by the mirror is visible from a point wholly at one side of the demonstrator, and without obstruction by the tread and by feet thereon.

2. A foot demonstrator comprising a flat transparent tread, an open frame surmounted by and horizontally supporting the tread, a mirror located under the tread and arranged to reflect a foot bottom bearing on the tread, the frame including tread-supporting standards extending downward from the tread and spaced apart, to permit access to the bottom of the tread for cleaning, and the passage of light between the standards to the tread for illumination of a foot bottom thereon, the arrangement being such that a reflection by the mirror is visible from a point wholly at one side of the demonstrator, and without obstruction by the tread and by feet thereon, and means pivotally supporting the mirror on a horizontal axis, so that it may be adjusted to be viewed between the standards from different elevations above a floor supporting the demonstrator.

3. A foot demonstrator comprising a flat transparent tread, an open frame surmounted by and horizontally supporting the tread, and a mirror located under the tread and arranged to reflect a foot bottom bearing on the tread, the frame including two pairs of standards extending downward from the tread, the pairs and the standards of each pair being spaced apart, to permit the passage of light in various directions between the standards to the tread, to permit access to the bottom of the tread for cleaning, and the passage of light between the standards to the tread, for illumination of a foot bottom thereon, and transverse tie rods connecting the standards of each pair, and located at the lower portions of the openings therebetween, and means pivotally connecting the mirror with the tie rods, so that the mirror may be adjusted on a horizontal axis to be viewed between the standards from different elevations, above a floor supporting the demonstrator; the arrangement being such that a reflection by the mirror is visible from a point wholly at one side of the demonstrator, and without obstruction by the tread and by feet thereon.

In testimony whereof I have affixed my signature.

JOSEPH LELYVELD.